(12) United States Patent
Li

(10) Patent No.: US 7,856,070 B2
(45) Date of Patent: Dec. 21, 2010

(54) METHOD AND SYSTEM FOR DIGITAL BASEBAND RECEIVER WITH DIGITAL RF/IF/VLIF SUPPORT IN GSM/GPRS/EDGE COMPLIANT HANDSETS

(75) Inventor: Weidong Li, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 1411 days.

(21) Appl. No.: 10/929,855

(22) Filed: Aug. 30, 2004

(65) Prior Publication Data

US 2006/0034396 A1 Feb. 16, 2006

Related U.S. Application Data

(60) Provisional application No. 60/602,056, filed on Aug. 16, 2004.

(51) Int. Cl.
*H03K 9/00* (2006.01)
(52) U.S. Cl. ............. 375/316; 375/150; 375/324; 375/340; 375/343; 375/344; 375/345
(58) Field of Classification Search ............. 375/316, 375/324, 323, 373, 339, 150, 340, 343, 344, 375/345; 455/337
See application file for complete search history.

(56) References Cited

U.S. PATENT DOCUMENTS

| | | | |
|---|---|---|---|
| 6,597,748 B1 * | 7/2003 | Hietala et al. ............. 375/324 |
| 6,906,584 B1 * | 6/2005 | Moffat et al. ............. 330/69 |
| 7,024,169 B2 * | 4/2006 | Ciccarelli et al. ......... 455/232.1 |
| 2003/0109276 A1 | 6/2003 | Wilson |
| 2003/0143967 A1 * | 7/2003 | Ciccarelli et al. ......... 455/232.1 |
| 2003/0174641 A1 * | 9/2003 | Rahman ............. 370/206 |
| 2004/0041644 A1 * | 3/2004 | Khlat ............. 332/103 |
| 2004/0081256 A1 * | 4/2004 | Shi et al. ............. 375/317 |

(Continued)

FOREIGN PATENT DOCUMENTS

EP 0 486 095 A1 11/1991

(Continued)

OTHER PUBLICATIONS

European Patent Office, European search report for European Application No. 05016348.4-2411, dated Aug. 17, 2006.

(Continued)

*Primary Examiner*—Shuwang Liu
*Assistant Examiner*—Kabir A Timory
(74) *Attorney, Agent, or Firm*—McAndrews, Held & Malloy, Ltd.

(57) ABSTRACT

A method and system for digital baseband receiver with digital RF/IF/VLIF support in GSM/GPRS/EDGE compliant handsets. The method may comprise receiving an input signal which may be a digital RF signal, IF or VLIF signals, and the input signal may comprise of I and Q components. The serial digital RF signal may be converted to a parallel digital formatted signal, the latter of which may be transferred to an input of a multiplexer. The received IF signal or VLIF signal may be filtered and transferred to the input of the DU which may convert the VLIF signal to a baseband signal by processing the VLIF signal with a CORDIC algorithm. The DU may bypass processing the IF signal. The output of the DU may be transferred to the input of the multiplexer, such that the multiplexer may select the parallel digital formatted signal or the output of the DU.

20 Claims, 5 Drawing Sheets

U.S. PATENT DOCUMENTS

2004/0151140 A1    8/2004  Rozenblit
2004/0190660 A1*   9/2004  Morris et al. ............... 375/350
2005/0272400 A1*  12/2005  Chen et al. ................. 455/337

FOREIGN PATENT DOCUMENTS

| | | |
|---|---|---|
| EP | 1 176 709 A3 | 7/2001 |
| EP | 1 176 709 A2 | 1/2002 |
| EP | 1 603 297 A2 | 12/2005 |

OTHER PUBLICATIONS

Wilkins, PolarisTotal RadioTM, a highly Integrated RF Solution for GSM/GPRS and EDGE, IEEE Radio Frequency Integrated Circuits Symposium, 2003, pp. 383-386.

* cited by examiner

US 7,856,070 B2

METHOD AND SYSTEM FOR DIGITAL BASEBAND RECEIVER WITH DIGITAL RF/IF/VLIF SUPPORT IN GSM/GPRS/EDGE COMPLIANT HANDSETS

CROSS-REFERENCE TO RELATED APPLICATIONS/INCORPORATION BY REFERENCE

This application makes reference, claims priority to, and claims the benefit of U.S. Provisional Application Ser. No. 60/602,056 filed Aug. 16, 2004.

The above stated application is hereby incorporated herein by reference in its entirety.

FIELD OF THE INVENTION

Certain embodiments of the invention relate to reception and processing of RF signals. More specifically, certain embodiments of the invention relate to a method and system for a digital baseband receiver with digital RF/IF/VLIF support in GSM/GPRS/EDGE compliant handsets.

BACKGROUND OF THE INVENTION

Generally, transmitted radio frequency (RF) is received and transformed to an intermediate frequency (IF) which is then transformed to the actual signal desired, either voice or data. A later advancement led to two components being transmitted for every RF channel—an I component and a Q component. The I and Q components are in quadrature with each other, and therefore do not interfere with each other, thereby allowing greater information transmission than with conventional RF transmission. As a consequence, RF with I and Q components was chosen as the new standard baseband-RF interface for GSM/GPRS/EDGE phones.

GSM is a wireless communication system which relies on time-division multiple access standard for voice. As the demand for wireless data communication increased, GPRS was added to GSM to allow dedicated access to digital data rather than sending data over voice lines as modems and faxes do. Some examples of uses for digital data communications are access to the Internet, access to email and short message service (SMS), and access to multi-media communication. As the need for faster data rates increased, a software based solution called EDGE was introduced for GPRS which allowed data speeds to increase by a factor of more than three over the same frequency spectrum and radio frequency.

Traditionally, an RF module is utilized to convert the received RF frequency to an IF frequency, and another module would convert the IF to a baseband signal. However, some modern communication systems may use an IF of zero Hz. That is, the output of the RF module is a baseband signal. Notwithstanding, this signal is still referred to as IF. Also, other communication systems utilize very low intermediate frequency (VLIF), where the IF frequency is non-zero but lower than the traditional IF of several megahertz, for example, a VLIF frequency of 100 KHz. Some other communication systems may utilize serial digital data of the baseband signal, referred to as digital RF, as output of the RF modules.

As the operating requirements for wireless devices become more demanding, the complexity of the interactions between data processing hardware and RF modules also increases. For example, RF modules from various vendors may be required to work effectively with a baseband processor from a different vendor. The use of individual baseband receiver interfaces for each of the possible RF front-end receivers with which a baseband processor may interface, may prove to be costly in terms of layout space in an integrated circuit. Because component size and cost are critical concerns in wireless devices, the use of multiple baseband receiver interfaces should be limited as much as possible. Moreover, this approach may also limit the number of possible interfaces that may be implemented with a particular baseband processor.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for digital baseband receiver with digital RF/IF/VLIF support in GSM/GPRS/EDGE compliant handsets. Aspects of the method may comprise receiving an input signal which may be a digital RF signal, an IF signal, or a VLIF signal, and the input signal may comprise an I component and a Q component. The digital RF signal may be converted to a parallel digital formatted signal, the latter of which may be transferred to an input of a multiplexer. The received IF signal or VLIF signal may be filtered and transferred to the input of a derotation unit (DU). In an accordance with an embodiment of an invention, the DU may convert the VLIF signal to a baseband signal by processing the VLIF signal, and the DU may bypass processing the IF signal. The DU may use coordinate rotation digital calculation (CORDIC) algorithm for processing the VLIF signal.

A generated digital output may be based on the parallel digital formatted signal, the generated baseband signal or the bypassed IF signal, and this generated digital output may comprise an I component and a Q component. This generated digital output may be selected from at least a portion of the parallel digital formatted signal and at least a portion of the generated baseband signal, or may be selected from at least a portion of the parallel digital formatted signal and at least a portion of the bypassed IF signal. This generated digital output may also be filtered. At least one control signal which controls the converting, the bypassing, the generating of the baseband signal and the generating of the digital output may be generated and/or received.

Aspects of the system may comprise a plurality of filters, the DU, a serial to parallel unit, a plurality of multiplexers and a state machine controller. A first filter and a second filter may be coupled to the DU, and the DU may be coupled to a third filter and to a fourth filter. The third filter may be coupled to a first multiplexer and the fourth filter may be coupled to the second multiplexer. A serial to parallel unit (SPU) may be coupled to the first multiplexer and to the second multiplexer. The first multiplexer may be coupled to a fifth filter and the second multiplexer may be coupled to a sixth filter.

A first filter and a second filter may be adapted to filter an input signal which may be either an IF signal or a VLIF signal, and the input signal may have an I component and a Q component. The SPU may receive an input signal which may be a digital RF signal, which may have an I component and a Q component, and the SPU may be adapted to convert the digital RF signal to a parallel digital formatted signal with an I component and a Q component.

The DU may accept as an input the filtered input signal IF or VLIF, and if the input signal is VLIF, the DU may process the filtered input signal VLIF to generate a baseband signal. If the input signal is an IF signal, the DU may bypass processing of the filtered input signal IF. The DU may process the filtered input signal VLIF utilizing a CORDIC algorithm, for example. The first multiplexer and the second multiplexer may be adapted to multiplex the output of the DU, which may have an I component and a Q component, and the parallel digital formatted signal, which may have an I component and a Q component, to generate a digital output, which comprises an I component and a Q component. The fifth filter and the sixth filter may filter the I component and the Q component of the digital output. The system may receive and/or generate at least one control signal which controls the filtering, converting, the bypassing, the generating of the baseband signal and the generating of the digital output. In this regard, a finite state machine (FSM) may be adapted to generate the control signals.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a digital baseband receiver with DIGITAL RF/IF/VLIF support in GSM/GPRS/EDGE compliant handsets. Various aspects of the invention provide support for a plurality of different RF/IF interfaces including digital RF, VLIF and conventional IF. The digital baseband receiver provides the baseband processor with the capability to operate with all types of RF/IF chips on the market. In addition, since these three interfaces are designed in the same module within a single pipeline, the die size is much smaller than if the interfaces were designed separately, each with its own pipeline and control.

Figure 1:
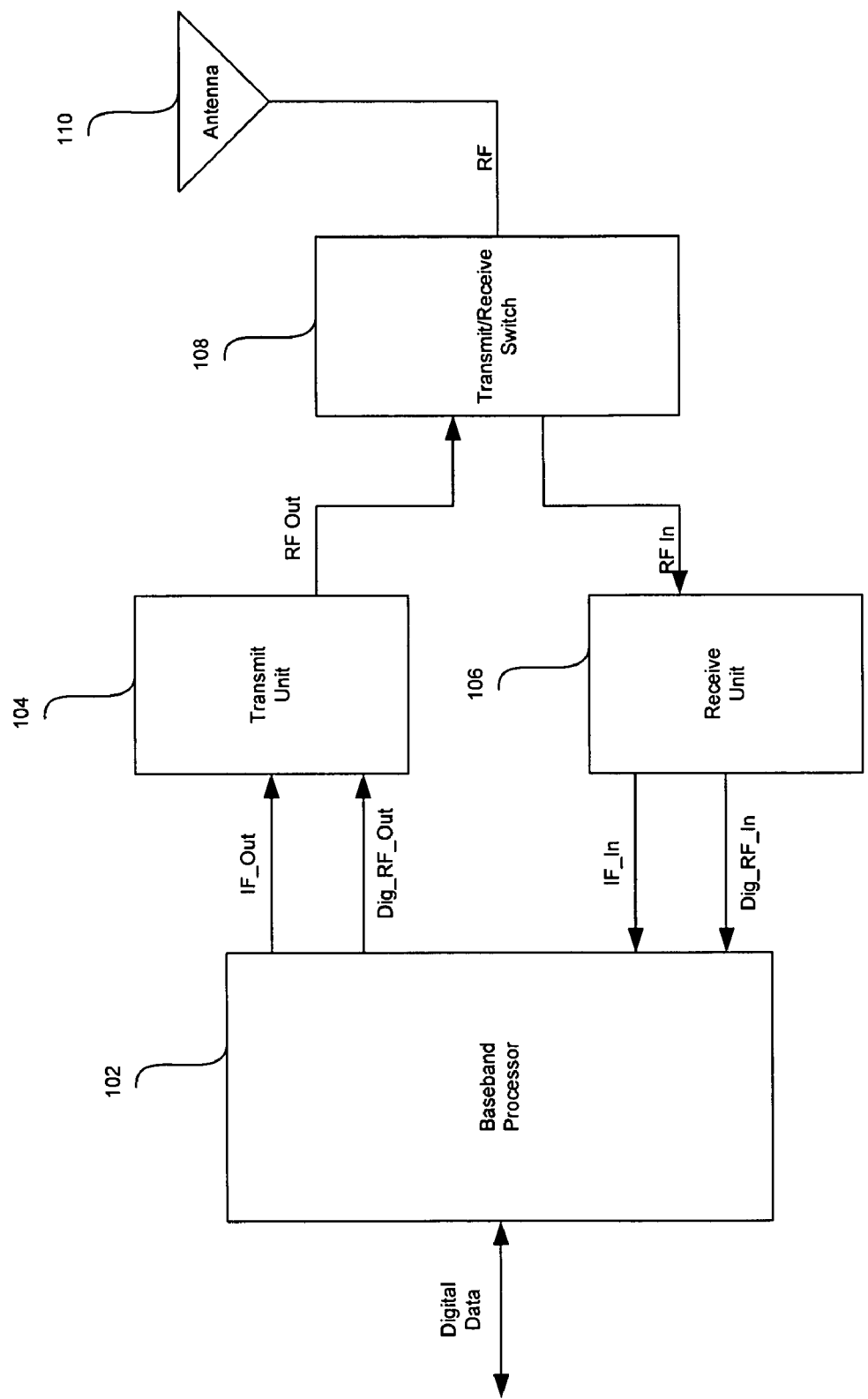
FIG. 1 is a block diagram of an exemplary system for a receiver and a transmitter system, in accordance with an embodiment of the invention.

FIG. 1 is a block diagram of an exemplary system for a receiver and a transmitter system, in accordance with an embodiment of the invention. Referring to FIG. 1, there is shown a baseband processor (BP) 102, a transmit unit (TU) 104, a receive unit (RU) 106, a transmit/receive switch (TRS) 108 and an antenna 110.

The BP 102 comprises suitable logic, circuitry and/or code that may be utilized to process analog IF or VLIF signals or digital RF signals to a proper parallel digital format so that digital signal processing may be performed upon a digital baseband signal output by the BP 102. The BP 102 may also receive the digital baseband signal as an input and process the digital signal so as to generate an analog IF signal, an analog VLIF signal, or a digital RF signal, which may be modulated to an analog RF signal by the TU 104.

The TU 104 comprises suitable logic, circuitry and/or code that may be utilized to convert analog IF signals, or analog VLIF signals or digital RF signals to analog RF signals suitable for transmission. The TU 104 may modulate the baseband analog IF signal directly to an analog RF signal, or modulate the analog VLIF signal to the analog RF signal, or convert the digital RF signal to the analog RF signal. The analog RF signal may be filtered by a bandpass filter to remove unwanted frequencies and then amplified to the desired power level before being transmitted via an antenna 110.

The RU 106 comprises suitable logic, and/or code that may be utilized to convert analog RF signals to analog IF signals, analog VLIF signals or digital RF signals. The RU 106 may first filter the received analog RF signal to remove the unwanted frequencies and then amplify the analog RF signal. This amplified signal may then be demodulated to a baseband analog IF signal, to an analog VLIF signal or to a digital RF signal. This demodulated signal may then be further processed by the BP 102.

The TRS 108 comprises suitable logic, circuitry or code that may be utilized to allow RF signals to the antenna 110 from the TU 104 or to allow RF signals from the antenna 110 to the RU 106. Physically, the TRS 108 is a single pole double throw switch that, in either position, may have a very low loss in the "on" state, for example 0.5 dB, and a very high isolation in the "OFF" state, for example 30 dB. The TRS may also have very low distortion in order to keep the integrity of the signals being received and transmitted.

In the transmission phase, a digital data (Digital Data) signal may be received by the BP 102 from a digital signal source, a digital signal processor (DSP), for example. The BP 102 may convert Digital Data to either analog IF or analog VLIF (IF_Out) or digital RF (Dig_RF_Out) and output these signals to the TU 102. The TU 102 may then modulate IF_Out or Dig_RF_Out from the BP 102 to the desired RF frequency, for example, approximately 900 MHz for cellular systems and approximately 1900 MHz for PCS systems, and output a modulated signal (RF Out). The TRS 108 may receive the RF Out signal, and may allow the output signal (RF) to propagate to the antenna 110 if the TRS 108 is in transmit mode. The antenna 110 then may radiate the RF signal for broadcast through the appropriate medium, for example, the atmosphere.

During the receive phase, the antenna 110 may receive the analog RF signal and then send the analog RF signal (RF) as input to the TRS 108, which may allow the output of TRS 108 (RF In) to propagate to the RU 106 if the TRS 108 is in receive mode. The RU 106 may receive the RF In signal and demodulate it to analog IF signal or analog VLIF signal (IF_In), or digital RF signal (Dig_RF_In) as an input signal to the BP 102. BP 102 may convert the input signal to parallel digital data for further processing as may be required, by the DSP, for example.

Figure 2:
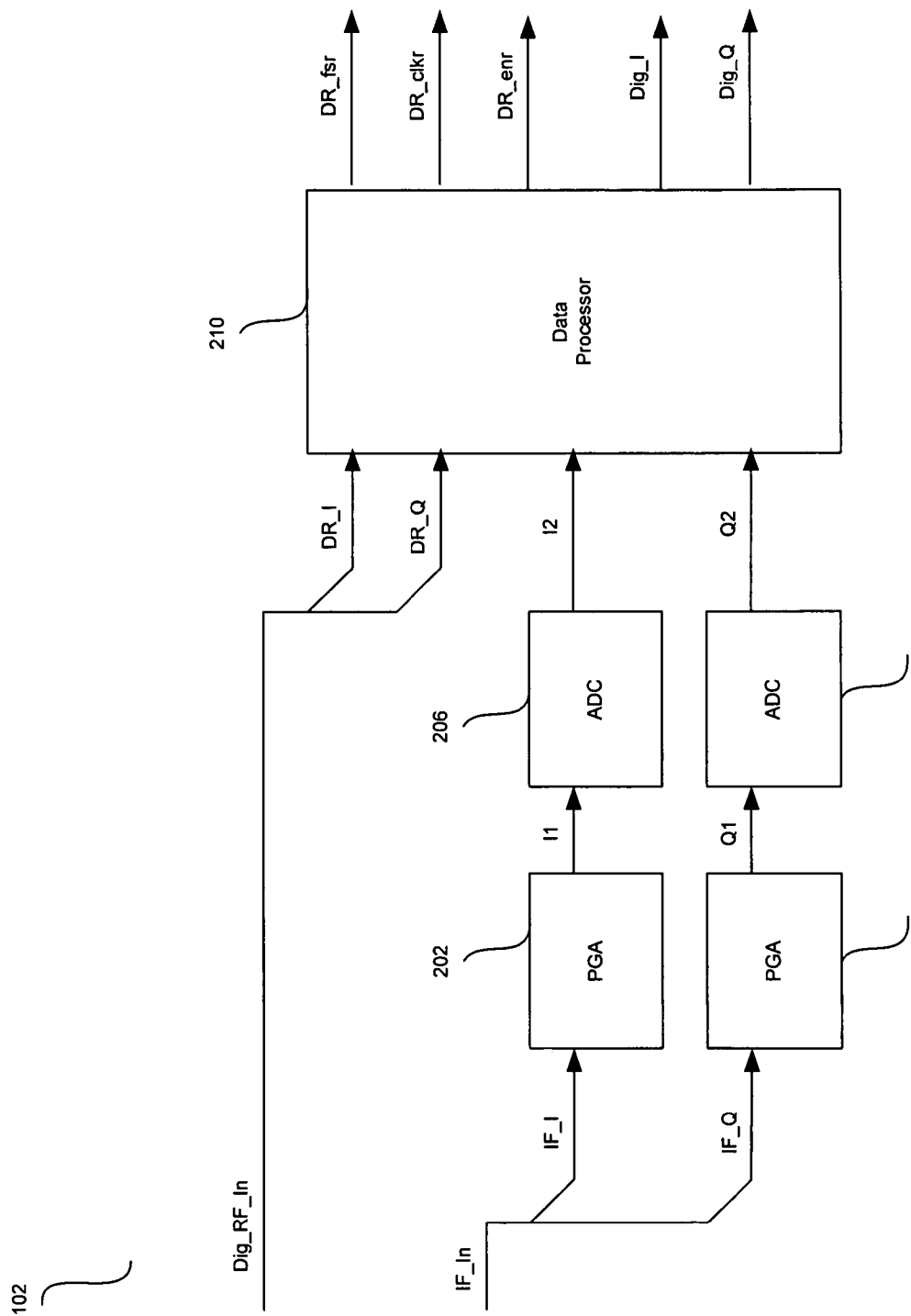
FIG. 2 is a block diagram illustrating an embodiment of an exemplary baseband processor of FIG. 1, for example, in accordance with an embodiment of the invention.

FIG. 2 is a block diagram illustrating an embodiment of an exemplary BP 102 of FIG. 1, for example, in accordance with an embodiment of the invention. Referring to FIG. 2, there is shown amplifiers 202 and 204, analog to digital converters (ADCs) 206 and 208, and data processor (DP) 210. FIG. 2 illustrates processing of an analog input signal IF_In or a digital RF input signal (Dig_RF_In), both of which comprise an I component and a Q component.

The PGAs 202 and 204 comprise suitable logic, circuitry and/or code that may be utilized to amplify and/or filter IF_In which may be at IF or VLIF frequencies. In this regard, the PGA may comprise programmable gain amplifier circuitry and/or analog filter circuitry which may be adapted to amplify and/or filter IF_In to remove unwanted frequencies. The input to the PGA 202 may be an I-component intermediate frequency referred to as IF_I and the output of the PGA 202 may be referred to as I1. The input to the PGA 204 may be a Q-component intermediate frequency referred to as IF_Q. The output of the PGA 204 may be referred to as Q1.

The ADCs 206 and 208 comprise suitable logic, circuitry and/or code that may be utilized to convert an analog signal to a digital signal in a parallel format, for example, 8 bit word, 16 bit word, 24 bit word, or 32 bit word. The input to the ADC 206 may be referred to as I1 and the output of the ADC 206 may be referred to as I2. The input to the ADC 208 may be referred to as Q1 and the output of the ADC 208 may be referred to as Q2.

The DP 210 comprises suitable logic, circuitry and/or code that may be utilized to process digital input and generate suitable control signals for interfacing to a RU 106 such that IF, VLIF or digital RF signals may be received from the RU 106. The DP 210 may be adapted to receive an I component of the Dig_RF_In (BR_I) and a Q component of the Dig_RF_In (BR_Q), I2 and Q2. I2 may be derived from the I component IF_I of the analog input signal IF_In, which may be filtered and converted to a parallel digital format. Q2 may be derived from the Q component IF_Q of the analog input signal IF_In, which may be filtered and converted to a parallel digital format. Some of the outputs of the DP 210 may be three signals to the RU 106—a synchronizing signal DR_fsr, a clock signal DR_clkr and an enable signal DR_enr.

The DP 210 may be adapted to generate a plurality of output signals which may comprise DR_fsr, DR_clkr and DR_enr. The signal DR_enr may enable the serial transfer of Dig_RF_In signal from the RU 106 to the DP 210. The signal DR_clkr may function as a clock, which may facilitate the transfer of the Dig_RF_In signal. The signal DR_fsr may function as a frame synchronizing input for the transfer of Dig_RF_In signal from the RU 106 to the DP 210.

Figure 3:
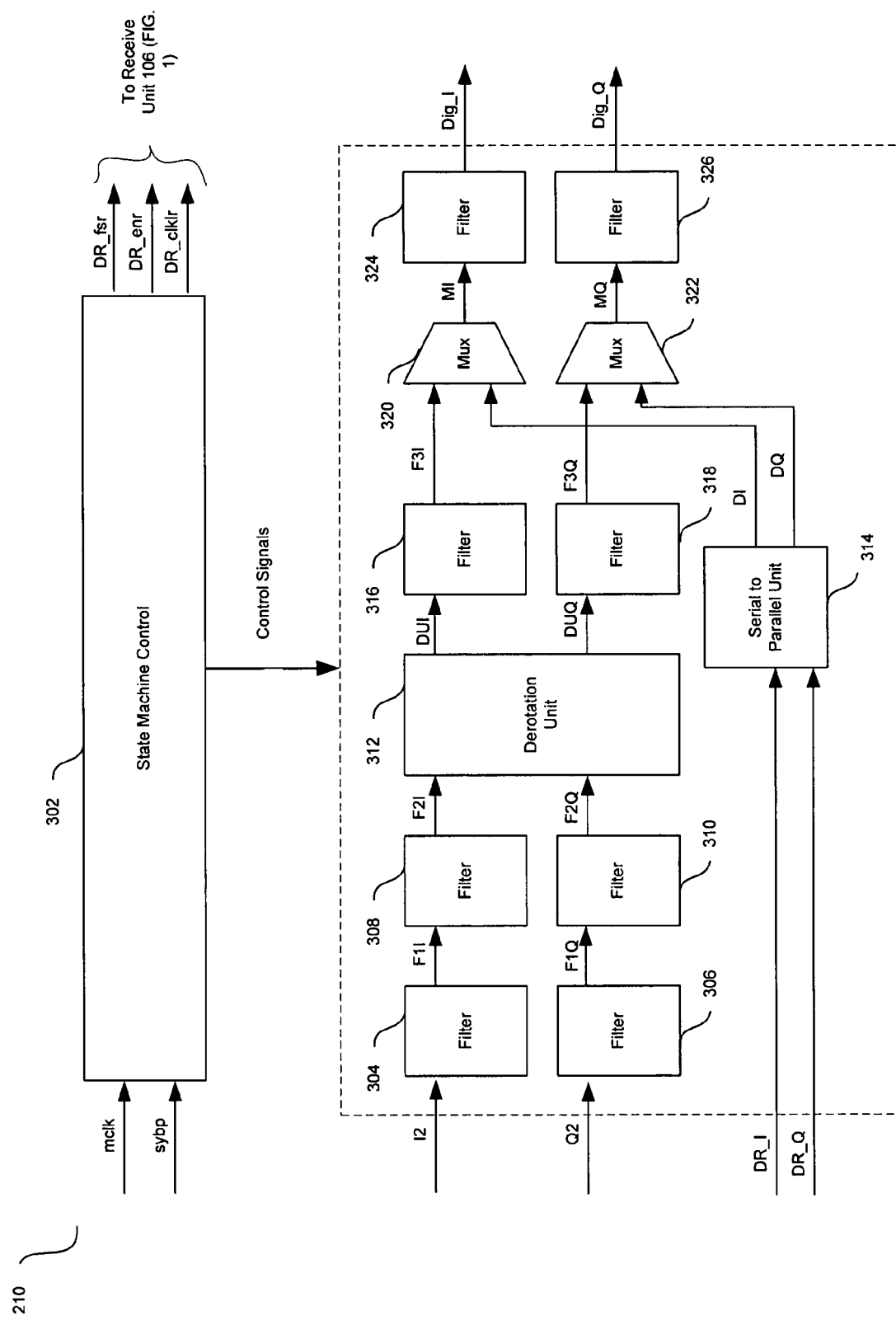
FIG. 3 is a block diagram illustrating an embodiment of an exemplary data processor of FIG. 2, for example, in accordance with an embodiment of the invention.

FIG. 3 is a block diagram illustrating an embodiment of an exemplary data processor of FIG. 2, for example, in accordance with an embodiment of the invention. Referring to FIG. 3, there is shown a state machine control (SMC) 302, filters 304, 306, 308, 310, 316, 318, 324 and 326, a derotation unit (DU) 312, a serial to parallel unit (SPU) 314, and multiplexers 320 and 322.

The SMC 302 comprises suitable logic, circuitry and/or code that may be utilized to generate control signals for the transfer of data from the RU 106, to transfer data within the components of the DP 210 (FIG. 2), and to control the functionality of the components of the DP 210 (FIG. 2). The SMC 302 may comprise a plurality of inputs, namely mclk and sybp, which may be used to generate control signals DR_fir, DR_enr and DR_clkr. The SMC 302 may disable the functionalities of certain blocks in order to save power if they are not needed for a particular input. For example, if the inputs DR_I and DR_Q are used, then filters 304, 306, 308, 310, 316 and 318, and the DU 312 may not need to be operational.

The filters 304, 306, 308, 310, 316, 318, 324 and 326 comprise suitable logic, circuitry and/or code that may be utilized to filter a digital signal. For example, the filters 304 and 306 may be third-order SINC decimation filters having 12-to-1 (12:1) ratio, the filters 308 and 310 may be 25-tap FIR decimation filters having 2:1 ratio where the maximum tap value may be 2047, and filters 316, 318, 324 and 326 may be 32-tap FIR decimation filters having 2:1 ratio where the maximum tap value may be 4082. The decimation filters may be adapted to remove out-of-band signals and noise, and to reduce the sample rate. In an illustrative embodiment of the invention, the filters 304 and 306 may be decimation filters having 12:1 ratio and may have an input sample rate, or frequency, of about 26 MHz. The output frequency may then be about 2.17 MHz. Similarly, the filters 308 and 310 may be decimation filters having a ratio 2:1 and may have an input frequency of about 2.17 MHz. The output frequency may then be about 1.09 MHz.

The DU 312 comprises suitable logic, circuitry and/or code that may be utilized to operate on the digital VLIF signals so that the VLIF frequency may be removed, so as to generate an output baseband signal. The SPU 314 comprises suitable logic, circuitry and/or code that may be utilized to convert a serial digital DR_I and DR_Q signals into parallel digital data signal DI and DQ. The parallel digital signals may be 16-bit parallel data signals after the serial-to-parallel conversion. The multiplexers 320 and 322 comprise suitable logic, circuitry and/or code that may be utilized to multiplex parallel digital data. For example, the multiplexers 320 and 322 may comprise two inputs and one output.

The I component input I2 and the Q component input Q2 may be filtered by filters 304, 308, 306 and 310. For example, if filters 304 and 306 are decimation filters having 12:1 ratio, the outputs F1I and F1Q will be one-twelfth the frequency of the inputs I2 and Q2. In a similar example, if filters 308 and 310 are decimation filters having 2:1 ratio, the outputs F2I and F2Q may be one-half the frequency of the inputs F1I and F1Q. F2I and F2Q may be inputs to the DU 312, and if they have been derived from the VLIF signal, the DU 312 may process the inputs F2I and F2Q so as to output baseband signals DUI and DUQ. The processing may remove the VLIF modulation frequency and may comprise CORDIC algorithms. If the inputs F2I and F2Q to DU 312 have been derived from the IF signal, the signals F2I and F2Q may bypass the processing of the DU 312, and the outputs DUI and DUQ may be the same as the inputs F2I and F2Q. The outputs DUI and DUQ may be filtered by filters 316 and 318, which may be decimating filters having a ratio of 2:1, and the outputs F3I and F3Q may be one-half of the frequency of DUI and DUQ, for example.

The I component input DR_I and the Q component input DR_Q may be received by the SPU 314, which may convert the serial digital data of DR_I and DR_Q to parallel digital format outputs of DI and DQ The output DI may be multiplexed by the multiplexer 320 with the output F3I, and the output DQ may be multiplexed by the multiplexer 322 with the output F3Q. The outputs MI and MQ of the multiplexers 320 and 322, respectively, may be filtered by decimation filters 324 and 326, respectively, having a ratio 2:1, for example. The outputs of the filters 324 and 326 may be the I component Dig_I and the Q component Dig_Q, respectively.

Figure 4:
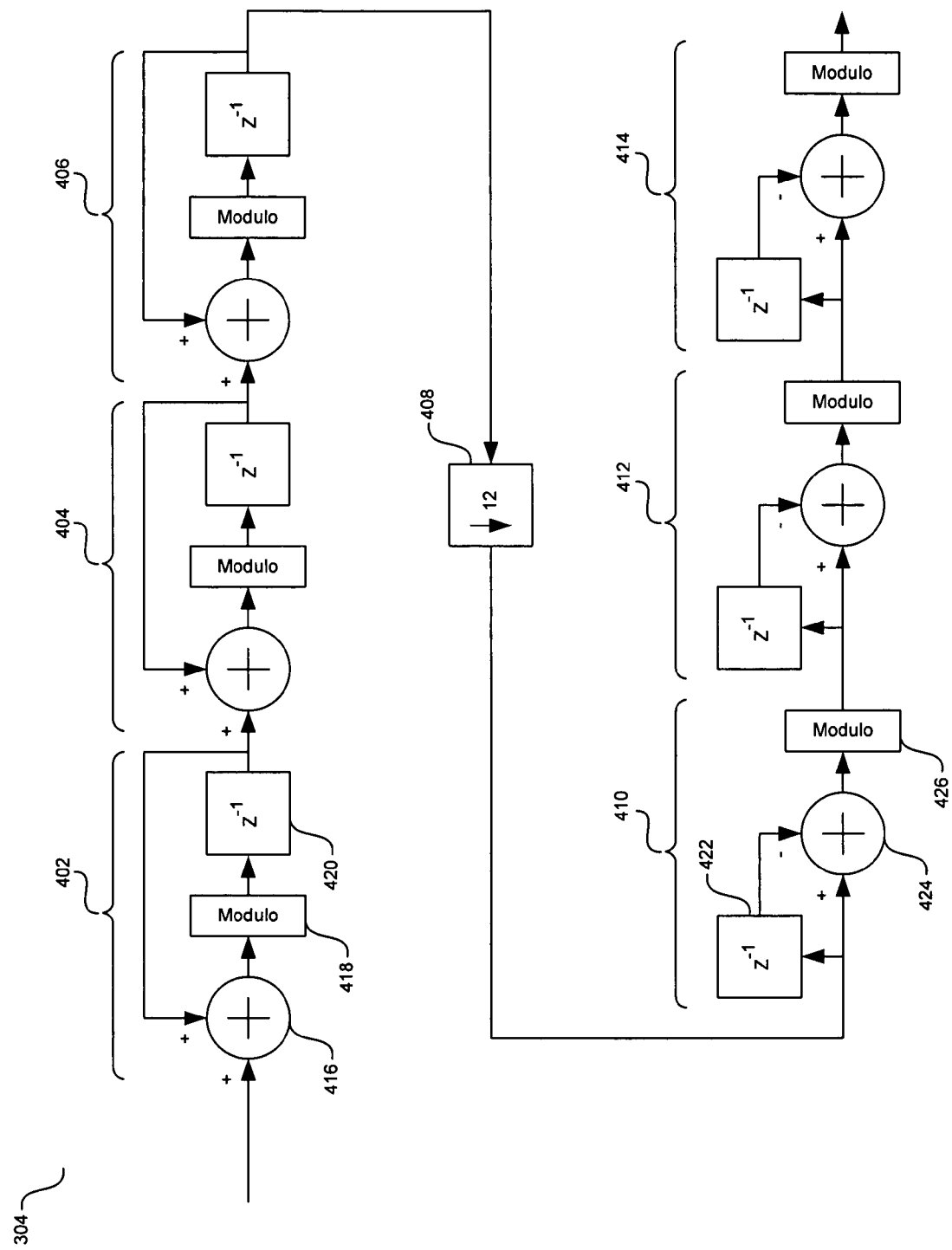
FIG. 4 is a block diagram illustrating an exemplary implementation of a filter, such as a SINC filter, which may be utilized in connection with an embodiment of the invention.

FIG. 4 is a block diagram illustrating an exemplary implementation of a filter, such as a SINC filter, which may be utilized in connection with an embodiment of the invention. Referring to FIG. 4, a third order SINC filter implementation, which may be similar to the filter 304 (FIG. 3), may comprise integrators 402, 404, 406, a downsampler 408, and differentiators 410, 412, 414. The integrators 402, 404, 406 may comprise an adder 416, a modulo operator 418, and delay $z^{-1}$ 420. The differentiators 410, 412, 414 may comprise a delay $z^{-1}$ 422, an adder 424, and a modulo operator 426. The differentiators 410, 412, 414 may perform the operation of a 3-stage comb filter.

The adder 416 may comprise suitable logic, circuitry, and/or code and may be adapted to add the input and output of the integrators 402, 404, 406. In this exemplary implementation of the integrator 402, the input may be a 4-bit value and the output from the delay $z^{-1}$ 420 may be a 15-bit value. For the integrators 404, 406, the inputs may be a 15-bit value and the outputs may also be a 15-bit value. The delay $z^{-1}$ 420 may comprise suitable logic, circuitry, and/or code and may be adapted to provide a one unit of time delay. In an exemplary implementation of the delay $z^{-1}$ 420, the input may be a 15-bit value and the output may be a 15-bit value. The modulo operator 418 may comprise suitable logic, circuitry, and/or code and may be adapted to assign $x=x-2^{15}$ when $x>2^{14}-1$ and $x=x+2^{15}$ when $x<-2^{14}$, where x may be the input to the modulo operator 418.

The downsampler 408 may comprise suitable logic, circuitry, and/or code and may be adapted to downsample a digital signal. In this exemplary third order SINC filter implementation of the filter 304 (FIG. 3), the downsampler 408 may be adapted to perform a 12-bit downsampling of the output of the integrator 406. In alternative implementations, where a filter may have different decimation ratios, the downsampler 408 may perform an N-bit downsampling, where N corresponds to the desired decimation ratio.

The adder 424 may comprise suitable logic, circuitry, and/or code and may be adapted to add the input to differentiators 410, 412, 414 and subtract the output of the delay $z^{-1}$ 422 in the differentiators 410, 412, 414. In this exemplary implementation of the differentiators 410, 412, 414, the inputs may be a 15-bit value and the outputs may also be a 15-bit value. The delay $z^{-1}$ 422 may comprise suitable logic, circuitry, and/or code and may be adapted to provide a one unit of time delay. In an exemplary implementation of the delay $z^{-1}$ 422, the input may be a 15-bit value and the output may be a 15-bit value. The modulo operator 426 may comprise suitable logic, circuitry, and/or code and may be adapted to assign $x=x-2^{15}$ when $x>2^{14}-1$ and $x=x+2^{15}$ when $x<-2^{14}$, where x may be the input to the modulo operator 426.

Figure 5:
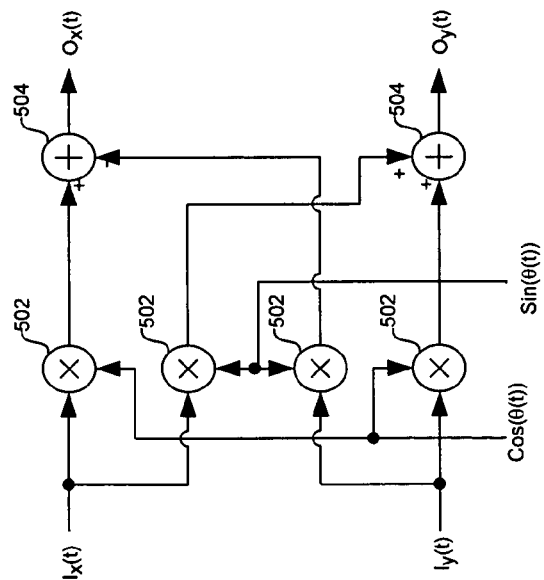
FIG. 5 is a block diagram illustrating an exemplary derotation unit, in accordance with an embodiment of the present invention.

FIG. 5 is a block diagram illustrating an exemplary derotation unit, in accordance with an embodiment of the present invention. Referring to FIG. 5, an exemplary implementation of the frequency removal function of the DU 312 (FIG. 3) may comprise mixers 502 and adders 504. The mixers 502 may comprise suitable logic, circuitry, and/or code and may be adapted to mix the inputs to the DU 312 (FIG. 3) with the corresponding trigonometric values. The adders 504 may comprise suitable logic, circuitry, and/or code and may be adapted to add and/or subtract the outputs from mixers 502 to determine the output of the DU 312 (FIG. 3).

The derotation function may be expressed as follows:

$$\begin{Bmatrix} O_x(t) \\ O_y(t) \end{Bmatrix} = \begin{Bmatrix} I_x(t)\cos(\theta(t)) - I_y(t)\sin(\theta(t)) \\ I_x(t)\sin(\theta(t)) + I_y(t)\cos(\theta(t)) \end{Bmatrix},$$

where $I_x(t)$ and $I_y(t)$ may be the inputs to the DU 312 and may correspond to the F2I and F2Q data signals, respectively. $O_x(t)$ and $O_y(t)$ may be the outputs of DU 312 and may correspond to the frequency-shifted values DUI and DUQ data signal components, respectively, and $\theta(t)$ may be an angle between 0-360 degrees. The expression for the derotation function may not require separate determination of the $\cos(\theta(t))$ and the $\sin(\theta(t))$ because the expression may be determined by utilizing a coordinate rotations digital computer (CORDIC) algorithm. In this exemplary implementation, the angle $\theta(t)$ may be represented by a 17-bit value and the inputs and outputs of the DU 312 may be 16-bit values. The angle $\theta(t)$ may be expressed as $\theta(t)=\theta(t-1)+\Delta\theta$, where $\Delta\theta$ may represent a phase increment with each sampling period and may be stored in a register in the DU 312 so that the VLIF frequency may be removed from the input signals F2I and F2Q, where an alternate embodiment of the invention may have the register functionality external to the DU 312. For example, for a frequency bandwidth of 100 KHz and a sampling rate of 13/12 MHz, then $\Delta\theta=12099$. In this exemplary implementation, when $\theta(t)>2^{17}$, $\theta(t)$ may equal $\theta(t)-2^{17}$ and when $\theta(t)<0$, then $\theta(t)$ may equal $\theta(t)+2^{17}$. The value of $\theta(t)$ may also be determined as:

$$\theta(t) = \begin{cases} \theta(t-1) + \Delta\theta & \Delta\theta > 0 \\ \theta(t-1) + 2^{17} + \Delta\theta & \Delta\theta < 0. \end{cases}$$

Figure 6:
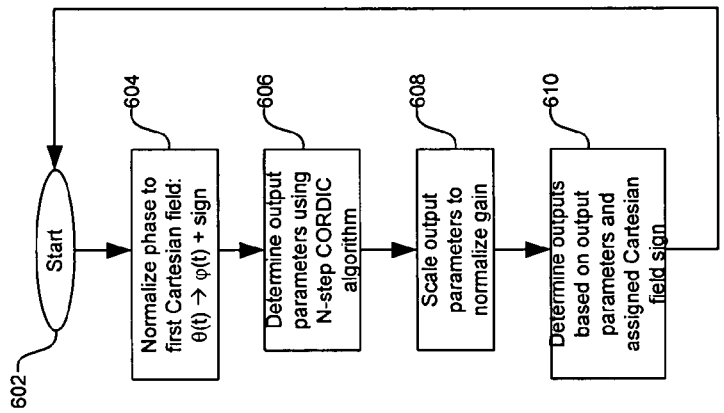
FIG. 6 illustrates an exemplary flow diagram of a CORDIC algorithm that may be utilized to determine the output of the derotation unit, in accordance with an embodiment of the present invention.

FIG. 6 illustrates an exemplary flow diagram of a CORDIC algorithm that may be utilized to determine the output of the derotation unit, in accordance with an embodiment of the present invention. Referring to FIG. 6, after start step 602, in step 604, the DU 312 (FIG. 3) may normalize the phase to the first Cartesian field by assigning $\theta(t)$ a first Cartesian field value $\phi$ and a sign value. For example, when $\theta(t)<32768$ (or $2^{15}$), then $\phi$ may equal $\theta(t)$ and sign may equal 0; when $32768 \leq \theta(t) < 65536$ (or $2^{16}$), then $\phi$ may equal $\theta(t)-32768$ and sign may equal 1; when $65536 \leq \theta(t) < 98304$ (or $2^{17}-2^{15}$), then $\phi$ may equal $\theta(t)-65536$ and sign may equal 2; else, $\phi$ may equal $\theta(t)-98304$ and sign may equal 3.

In step 606, output parameters x and y may be determined using a CORDIC algorithm. The algorithm may begin by setting $x=I_x(t)$ and $y=I_y(t)$, where $I_x(t)$ and $I_y(t)$ may correspond to the inputs to the DU 312 (FIG. 3), F2I and F2Q, respectively. For an N-step CORDIC algorithm a step size table STEPS[N] may be determined, where integer N may be the step size table size. The step size table may be located in the DU 312 (FIG. 3), or an alternate embodiment of the invention may have the table located external to the DU 312 (FIG. 3). In an exemplary implementation of the CORDIC algorithm, the following steps may be taken:

```
for j = 1 to N -1
{    d_x = x >> j ;
     d_y = y >> j ;
     When φ ≧ 0, then
         φ = φ - STEPS[j] ;
         x = x - d_y ;
         y = y + d_x ;
     else
         φ = φ + STEPS[j] ;
         x = x + d_y ;
         y = y - d_x ;         },
``` where j may be a counter value, N may be the size of the step size table STEPS[N], $d_x$ and $d_y$ may be temporary variables, and STEPS[j] may correspond to the jth entry in STEPS[N]. The operation $d_y=y>>j$ represents a right shift of the output parameter y by a number of bits indicated by the counter value j.

In step 608 in FIG. 6, the output parameters x and y may be scaled to normalize the gain produced by the loop operations in step 606. In this exemplary CORDIC implementation, the scaling of the output parameters may be x=round (x*311/512) and y=round (y*311/512), where round represents a rounding operation.

In step 610, the outputs $O_x(t)$ and $O_y(t)$ may be determined based on the output parameters x and y from step 608 and the sign values determined in step 604. For example, when sign=0, then $O_x(t)$=x and $O_y(t)$=y; when sign=1, then $O_x(t)$=−y and $O_y(t)$=x; when sign=2, then $O_x(t)$=−x and $O_y(t)$=y; and when sign=4, then $O_x(t)$=y and $O_y(t)$=−x. When the values for the outputs $O_x(t)$ and $O_y(t)$ have been determined in step 610, the DU 312 (FIG. 3) may return to start step 602 to remove the VLIF frequency from the next I and Q data signals to arrive.

Figure 7:
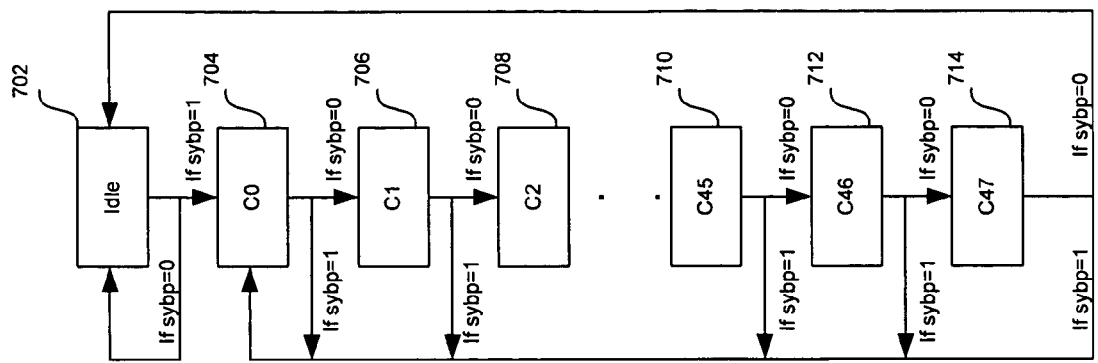
FIG. 7 illustrates an exemplary state diagram of an implementation of a state machine control in accordance with an embodiment of the present invention.

FIG. 7 illustrates an exemplary state diagram of an implementation of a state machine control (SMC) in accordance with an embodiment of the present invention. FIG. 7 is an embodiment of the SMC 302 of FIG. 3, for example. The SMC of FIG. 7 may comprise a plurality of states, including: Idle 702, C0 704, C1 706, C2 708, . . . , C45 710, C46 712, and C47 714. The SMC may have two inputs, which may be used to generate the states in FIG. 7. The first input may be a signal sybp and the second input may be a clock input mclk whose rising edge clocks the transition from one state to the next. The SMC may initially be in state Idle 702. When the signal sybp is logic "1" at the rising edge of the mclk signal, the state machine may transition to state C0 704, and when the signal sybp is logic "0" at the rising edge of the mclk signal the state machine may stay in state C0 702. When the SMC is in states C0 704 to C46 712, inclusive, if the signal sybp is logic "0" at the rising edge of the mclk signal, the SMC may transition to the next state, for example, from state C0 704 to state C1 706, from state C1 706 to state C2 708, . . . , from state C45 710 to state C46 712, and from state C46 712 to state C47 714. If the signal sybp is logic "1" at the rising edge of the mclk signal the next transition may be to the state C0 704. If the SMC is in state C47 714, and the signal sybp is logic "1" the next transition may be to state C0 704, and if sybp is logic "0" the next transition may be to state Idle 702.

In an exemplary embodiment of the invention, a binary number may be used to represent each of the states via a unique bit pattern. The different bits in each of the binary numbers may be used to generate control signals for different blocks of the DP 210 such as the filters 304, 306, 308, 310, 316, 318, 324 and 326, the DU 312, and generate the digital RF interface signals DR_fsr, DR_enr and DR_clkr.

In the exemplary embodiment of FIG. 7, the control signal of the digital RF interface Dig_rf_fsr may be the least significant bit of the binary word. Filters 304 and 306 may have a control signal which may be the signal sybp. Filters 308 and 310 may have controls signals comprised of bits 17 through 23 of the binary word. Filters 316 and 318 may have control signals comprised of bits 9 through bits 16 of the binary word. Filters 324 and 326 may have control signals comprised of bits 1 through 8 of the binary word. The DU 312 may have control signals comprised of bits 9 through 23 of the binary number.

The DP 210 may be programmed so that the DP 210 may function as desired. For example, the digital signal processor which may process the output signals DG_I and DG_Q of the DP 210 may program the parameters. Some of the information that may be programmed are the type of input, whether digital RF, IF or VLIF, the coefficients for the FIR filters, for example, filters 308, 310, 316, 318, 324, 326 if they have been implemented as FIR filters, and values to the DU 312 so that the VLIF frequency may be removed by the DU 312.

The parallel digital data I2 and Q2, which may be generated from IF or VLIF signals, may be filtered by filters 304, 306, 308 and 310 which may reduce the sample rate, or the frequency, of the input signals. For example, if filters 304 and 306 are decimation filters having 12:1 ratio, the frequency of the outputs F1I and F2I may be one-twelfth the frequency of the inputs I2 and Q2, respectively. In a similar example, if the filters 308 and 310 are decimation filters having 2:1 ratio, the frequency of outputs F2I and F2Q may be one-half the frequency of the input signals F1I and F1Q. If signals I2 and Q2 are from VLIF signals, the DU 312 may remove the VLIF frequency components as part of retrieving the desired data. However, if I2 and Q2 are from IF signals, the DU 312 may appear transparent to the signals I2 and Q2. The control signals from the SMC 302 may be utilized to deactivate the derotation functionality when it may not be needed, such as for I2 and Q2 for IF signals. The output of the DU 312, the signals DUI and DUQ, may be filtered by filters 316 and 318 which may be implemented as decimation filters having a ratio of 2:1. The output of these filters 316 and 318, F3I and F3Q, respectively, may have a frequency one-half of the input of these filters 316 and 318, DUI and DUQ, respectively, and may be the first inputs to the multiplexers 320 and 322, respectively.

The serial digital RF inputs DR_I and DR_Q may be inputs to the SPU 314. The signal DR_enr may be used to enable an interface to the RU 106 standard serial interface (SSI) bus. The signal DR_clkr may be utilized as a clock input for serial data transfer of DR_I and DR_Q. The signal DR_fsr may be utilized as a frame synchronization input for serial data transfer. The signals DR_I and DR_Q may be utilized as the serial digital data signal inputs. For example, the SSI bus may provide two samples of I and two samples of Q for each GSM symbol period. The input data pattern on DR_I may be 16 bits of I data followed by 8 blank bits, while the input data pattern for DR_Q may be 16 bits of Q data followed by 8 blank bits. In an exemplary embodiment of the invention, the DR_fsr may be 13/24 MHz or 541.667 KHz when the sampling rate of the ADCs 206 and 208 may be 26 MHz and may be used to mark the beginning of the I and Q data transfer, while the DR_clkr may be 13 MHz. If digital RF signals are used as inputs, the SMC 302 may deactivate the portions of DP 210 which may not be needed, for example, filters 304, 306, 308, 310, 316 and 318, and the DU 312.

The output of the SPU 314, DI and DQ, may be the second inputs to the multiplexers 320 and 322. The outputs of the multiplexers 320 and 322, MI and MQ, respectively, may be filtered by the filters 324 and 326, respectively. The filters 324 and 326 may be decimation filters having a ratio of 2:1, whereby the outputs of filters 324 and 326, Dig_I and Dig_Q, respectively, may be one-half the frequency of the inputs to the filters 324 and 326, MI and MQ, respectively.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing a plurality of signals, comprising:
    receiving an input signal;
    if said received input signal is a digital RF signal, converting said digital RF signal to a parallel digital formatted signal;
    if said received input signal is a VLIF signal, generating a baseband signal by processing said VLIF signal;
    if said received input signal is an IF signal, bypassing said processing of said IF signal;
    generating a digital output based on one of said parallel digital formatted signal, said generated baseband signal and said bypassed IF signal; and
    generating at least one control signal that controls said converting, said bypassing, said generating of said baseband signal and said generating of said digital output.

2. The method according to claim 1, wherein said received input signal comprises an I component and a Q component.

3. The method according to claim 1, comprising filtering said VLIF signal.

4. The method according to claim 1, comprising filtering said IF signal.

5. The method according to claim 1, wherein said generated digital output comprises an I component and a Q component.

6. The method according to claim 1, comprising filtering said generated digital output.

7. The method according to claim 1, wherein said generated digital output is selected from at least a portion of said parallel digital formatted signal and at least a portion of said generated baseband signal.

8. The method according to claim 1, wherein said generated digital output is selected from at least a portion of said parallel digital formatted signal and at least a portion of said bypassed IF signal.

9. The method according to claim 1, comprising filtering one or both of: said generated baseband signal and said bypassed IF signal.

10. The method according to claim 1, comprising receiving at least one control signal that controls said converting, said bypassing, said generating of said baseband signal and said generating of said digital output.

11. A system for processing a plurality of signals, comprising:
    one or more circuits that enable reception of an input signal;
    said one or more circuits enable conversion of said received input signal to a parallel digital formatted signal if said received input signal is a digital RF signal;
    said one or more circuits enable generation of a baseband signal by processing said received input signal if said received input signal is a VLIF signal;
    said one or more circuits enable bypassing processing of said received input signal if said received input signal is an IF signal;
    said one or more circuits enable generation of a digital output based on one of said parallel digital formatted signal, said generated baseband signal and said bypassed IF signal, and
    wherein said one or more circuits enable use of at least one control signal that controls said converting, said bypassing, said generating of said baseband signal and said generating of said digital output.

12. The system according to claim 11, wherein said received input signal comprises an I component and a Q component.

13. The system according to claim 11, wherein said one or more circuits enable filtering of said VLIF signal.

14. The system according to claim 11, wherein said one or more circuits enable filtering of said IF signal.

15. The system according to claim 11, wherein said generated digital output comprises an I component and a Q component.

16. The system according to claim 11, wherein said one or more circuits enable filtering of said generated digital output.

17. The system according to claim 11, wherein said one or more circuits enable selection of at least a portion of said parallel digital formatted signal and at least a portion of said generated baseband signal in generating said generated digital output.

18. The system according to claim 11, wherein said one or more circuits enable selection of at least a portion of said parallel digital formatted signal and at least a portion of said bypassed IF signal in generating said generated digital output.

19. The system according to claim 11, wherein said one or more circuits enable filtering of one or both of: said generated baseband signal and said bypassed IF signal.

20. The system according to claim 11, wherein said one or more circuits enable generation of at least one control signal that controls said converting, said bypassing, said generating of said baseband signal and said generating of said digital output.

* * * * *